(12) United States Patent
Huang et al.

(10) Patent No.: US 11,383,578 B2
(45) Date of Patent: Jul. 12, 2022

(54) TWO-POSITION EIGHT-WAY VALVE AND ELECTRIC VEHICLE AIR CONDITIONING SYSTEM

(71) Applicants: GREE ELECTRIC APPLIANCES (WUHAN) CO., LTD, Hubei (CN); GREE ELECTRIC APPLIANCES, INC. OF ZHUHAI, Qianshan Zhuhai (CN)

(72) Inventors: Chuanxi Huang, Qianshan Zhuhai (CN); Qiang Liu, Qianshan Zhuhai (CN); Huawen Qu, Qianshan Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Qianshan Zhuhai (CN)

( * ) Notice: Subject to any disclaimer, the term of this patent is extended or adjusted under 35 U.S.C. 154(b) by 246 days.

(21) Appl. No.: 16/644,819

(22) PCT Filed: Aug. 17, 2018

(86) PCT No.: PCT/CN2018/100950
§ 371 (c)(1),
(2) Date: Mar. 5, 2020

(87) PCT Pub. No.: WO2019/095758
PCT Pub. Date: May 23, 2019

(65) Prior Publication Data
US 2021/0070142 A1 Mar. 11, 2021

(30) Foreign Application Priority Data

Nov. 14, 2017 (CN) .......................... 201711121097.1

(51) Int. Cl.
B60H 1/00 (2006.01)
B60H 1/32 (2006.01)
(Continued)

(52) U.S. Cl.
CPC ..... B60H 1/00485 (2013.01); B60H 1/00392 (2013.01); B60H 1/3227 (2013.01); F16K 11/07 (2013.01); F16K 31/0613 (2013.01)

(58) Field of Classification Search
CPC ............ B60H 1/00485; B60H 1/00392; B60H 1/3227; F16K 11/07; F16K 31/0613;
(Continued)

(56) References Cited

U.S. PATENT DOCUMENTS 4,306,422 A * 12/1981 Korycki .................. F25B 13/00
137/625.48
9,790,101 B2 * 10/2017 Mehmi .................... C02F 1/008
(Continued)

FOREIGN PATENT DOCUMENTS

CN 202756734 U * 2/2013
CN 104265952 A 1/2015
(Continued)

OTHER PUBLICATIONS

International Search Report dated Oct. 25, 2018 in corresponding International Application No. PCT/CN2018/100950; 5 pages.

Primary Examiner — Marc E Norman
(74) Attorney, Agent, or Firm — Maier & Maier, PLLC

(57) ABSTRACT

A two-position eight-way valve, including a valve body, a sliding column, and a control mechanism. The valve body is provided with an accommodating space having an opening. The control mechanism is connected to the opening. Provided on a sidewall of the accommodating space are a first through hole, a second through hole, a third through hole, a fourth through hole, a fifth through hole, a sixth through
(Continued)

hole, a seventh through hole, and an eighth through hole allowing the accommodating space to be in communication with the external environment. The sliding column is provided within the accommodating space and is connected to the control mechanism.

10 Claims, 4 Drawing Sheets

(51) Int. Cl.
*F16K 11/07* (2006.01)
*F16K 31/06* (2006.01)

(58) Field of Classification Search
CPC ............ F25B 2313/027; F25B 2500/19; F25B 2600/2507; F25B 2600/2515
See application file for complete search history.

(56) References Cited

U.S. PATENT DOCUMENTS

| | | | |
|---|---|---|---|
| 10,697,681 B2 * | 6/2020 | He | B60H 1/00907 |
| 10,967,702 B2 * | 4/2021 | Mancini | B60H 1/00921 |
| 2014/0291559 A1 * | 10/2014 | Pilawski | F15B 13/0402 |
| | | | 251/62 |
| 2014/0326355 A1 * | 11/2014 | Nonaka | B29D 23/00 |
| | | | 138/126 |
| 2020/0271231 A1 * | 8/2020 | Kudermann | F16H 61/30 |

FOREIGN PATENT DOCUMENTS

| | | |
|---|---|---|
| CN | 104595525 A | 5/2015 |
| CN | 105840872 A | 8/2016 |
| CN | 107940029 A | 4/2018 |
| CN | 207569267 U | 7/2018 |
| JP | H11-325634 A | 11/1999 |
| JP | 2017-106686 A | 6/2017 |

* cited by examiner

TWO-POSITION EIGHT-WAY VALVE AND ELECTRIC VEHICLE AIR CONDITIONING SYSTEM

The present application claims the priority of the Chinese patent application with the filing number 201711121097.1, filed on Nov. 14, 2017 with the Chinese Patent Office, entitled "Two-position Eight-way Valve and Electric Vehicle Air Conditioning System", the entirety of which is incorporated herein by reference.

TECHNICAL FIELD

The present invention relates to the technical field of air conditioning, and particularly to a two-position eight-way valve and an electric vehicle air conditioning system.

BACKGROUND ART

Compared with conventional single-cold plus electric heating air conditioners, heat-pump type pure electric vehicle air conditioners have a more complex system. At present, all of the heat-pump type pure electric vehicle air conditioners use multiple solenoid valves to ensure realization and switching of cooling, heating, and defrosting functions of the system. Therefore, there are the problems of high cost, complicated control, and poor reliability, as well as the shortcomings of inconvenient mounting and fixing, and reduced production efficiency.

SUMMARY OF THE INVENTION

A main object of the present invention is to provide a two-position eight-way valve and an electric vehicle air conditioning system, which can realize the integration of functions of multiple solenoid valves, is not only inexpensive and easy to control, but is also convenient to mount, and increases the production efficiency.

The present invention provides a two-position eight-way valve, including a valve body, a sliding column, and a control mechanism;

the valve body is provided with an accommodating space having an opening, and the control mechanism is connected to the opening;

provided on a sidewall of the accommodating space are a first through hole, a second through hole, a third through hole, a fourth through hole, a fifth through hole, a sixth through hole, a seventh through hole and an eighth through hole allowing the accommodating space to be in communication with the external environment;

the sliding column is provided within the accommodating space and is connected to the control mechanism, and the control mechanism can drive the sliding column to shift and move between a first position away from the opening and a second position in proximity to the opening, thus controlling the opening and closing of the first through hole, the second through hole, the third through hole, the fourth through hole, the fifth through hole, the sixth through hole, the seventh through hole and the eighth through hole.

Preferably, the control mechanism is sealedly connected to the opening, so as to seal the accommodating space.

A first groove, a second groove and a third groove separated from each other are provided on a side face of the sliding column;

when the sliding column is located in the first position, the second through hole and the sixth through hole are both corresponding to the first groove, for allowing the second through hole and the sixth through hole to be in communication through the first groove, the third through hole and the seventh through hole are both corresponding to the second groove, for allowing the third through hole and the seventh through hole to be in communication through the second groove, and the fifth through hole and the eighth through hole are both corresponding to the third groove, for allowing the fifth through hole and the eighth through hole to be in communication through the third groove.

Preferably, when the sliding column is located in the second position, the first through hole and the sixth through hole are both corresponding to the first groove, for allowing the first through hole and the sixth through hole to be in communication through the first groove, the second through hole and the seventh through hole are both corresponding to the second groove, for allowing the second through hole and the seventh through hole to be in communication through the second groove, and the fourth through hole and the eighth through hole are both corresponding to the third groove, for allowing the fifth through hole and the eighth through hole to be in communication through the third groove.

Preferably, the accommodating space has a cylindrical shape, and the sliding column is a cylinder having a diameter matched with that of the accommodating space;

all of the first groove, the second groove and the third groove are in a ring shape extending in a circumferential direction of the sliding column, and arranged in turn along an axial direction of the sliding column.

Preferably, the control mechanism includes a static iron core, an elastic component, and a movable iron core;

the static iron core is fixedly connected on the valve body, and is connected with the movable iron core through the elastic component, and the movable iron core is connected with the sliding column;

the static iron core is provided with a solenoid coil, and when the solenoid coil is energized, the static iron core attracts the movable iron core through an electromagnetic force to drive the sliding column to move to the second position, and when the solenoid coil is de-energized, the elastic component drives, relying on its own elastic force, the movable iron core to drive the sliding column to move to the first position.

Preferably, the control mechanism further includes a connecting rod;

two ends of the connecting rod are respectively detachably connected on the movable iron core and the sliding column, so as to connect the movable iron core and the sliding column together.

In another aspect, the present invention provides an electric vehicle air conditioning system, including the two-position eight-way valve having any one of the above technical features.

Preferably, the electric vehicle air conditioning system further includes a compressor, an exterior heat exchanger and a first interior heat exchanger;

the compressor has a refrigerant inlet and a refrigerant outlet, the refrigerant inlet is connected to the seventh through hole, the refrigerant outlet is connected to the sixth through hole, two ends of the exterior heat exchanger are respectively connected to the second through hole and the eighth through hole, and two ends of the first interior heat exchanger are respectively connected to the third through hole and the fifth through hole, such that when the sliding column is located in the first position, the first interior heat exchanger is allowed to be respectively in communication with the compressor and the exterior heat exchanger through the two-position eight-way valve.

Preferably, a throttling component is provided on a connecting pipeline between the exterior heat exchanger and the eighth through hole.

Preferably, the electric vehicle air conditioning system further includes a second interior heat exchanger;

two ends of the second interior heat exchanger are respectively connected to the fourth through hole and the first through hole, such that when the sliding column is located in the second position, the second interior heat exchanger is allowed to be in communication respectively with the compressor and the exterior heat exchanger through the two-position eight-way valve.

The two-position eight-way valve provided in the present invention adopts the technical solution in which the control mechanism can drive the sliding column to shift and move between the second position in proximity to the end lid and the first position away from the end lid, thus controlling the opening and closing of the first through hole, the second through hole, the third through hole, the fourth through hole, the fifth through hole, the sixth through hole, the seventh through hole, and the eighth through hole, which can realize the integration of the functions of multiple solenoid valves, is not only inexpensive and easy to control, but is also convenient to mount, and increases production efficiency.

BRIEF DESCRIPTION OF THE DRAWINGS

The drawings described herein, constituting a portion of the present invention, are used for further understanding of the present invention. Illustrative embodiments of the present invention and description thereof are used to explain the present invention, rather than improperly limiting the present invention. In the figures.

In the figures: 1. valve body; 11. first through hole; 12. second through hole; 13. third through hole; 14. fourth through hole; 15. fifth through hole; 16. sixth through hole; 17. seventh through hole; 18. eighth through hole; 19. accommodating space; 191. opening; 2. sliding column; 21. first groove; 22. second groove; 23. third groove; 3. control mechanism; 31. static iron core; 311. solenoid coil; 32. elastic component; 33. movable iron core; 34. connecting rod; 4. two-position eight-way valve; 5. compressor; 51. refrigerant inlet; 52. refrigerant outlet; 6. exterior heat exchanger; 71. first interior heat exchanger; 72. second interior heat exchanger; 8. throttling component.

DETAILED DESCRIPTION OF THE EMBODIMENTS

In order to make the objects, technical solutions and advantages of the present invention clearer, the technical solutions of the present invention will be described clearly and completely in conjunction with the embodiments and corresponding figures in the present invention. Apparently, some but not all embodiments of the present invention are described. Based on the embodiments of the present invention, all the other embodiments, obtained by a person ordinarily skilled in the art without paying inventive effort, should fall within the scope of protection of the present invention.

It should be indicated that terms such as "first" and "second" in the description, the claims and the above figures of the present invention are used to distinguish similar objects, but are not necessarily used to describe a specific order or sequence. It should be understood that thus used terms can be exchanged where appropriate, such that the embodiments of the present invention described herein can be implemented in an order other than those illustrated or described herein.

Embodiment 1

Figure 1:
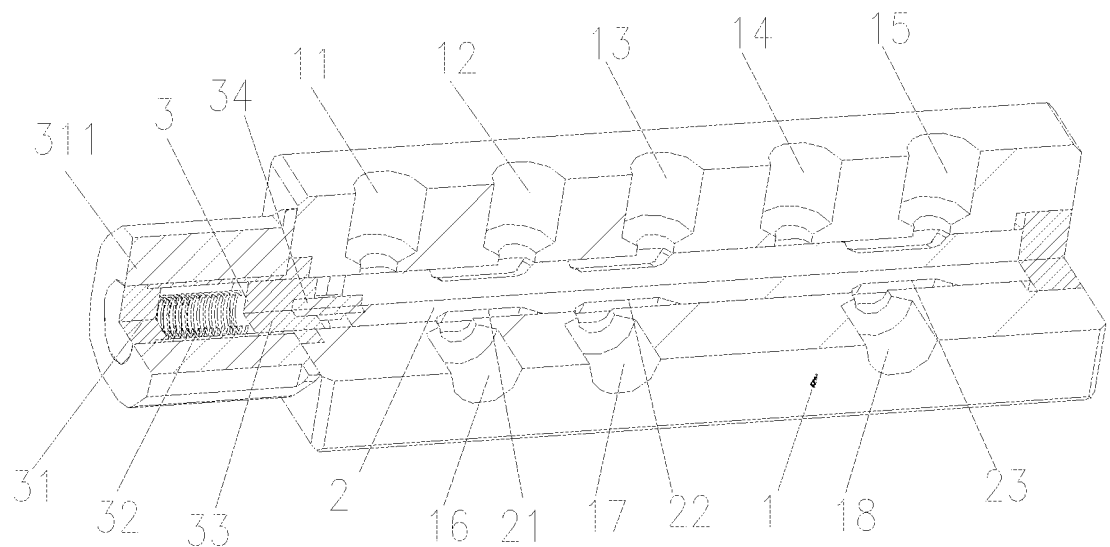
FIG. 1 is a structural schematic diagram of a two-position eight-way valve (with a sliding column being located in a first position) in Embodiment 1.
Figure 2:
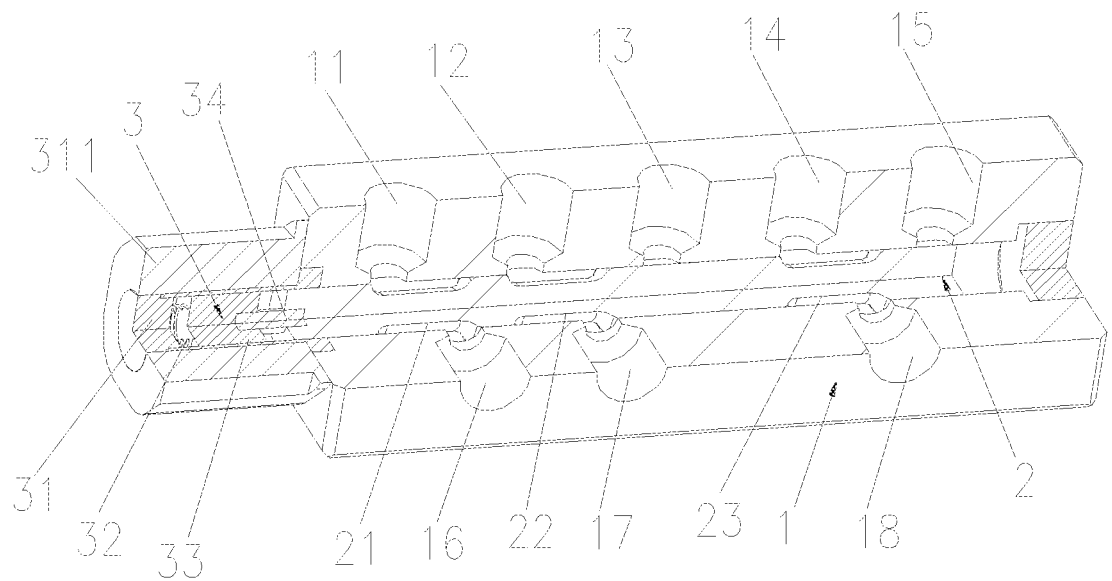
FIG. 2 is a schematic diagram of the two-position eight-way valve in FIG. 1 when the sliding column is located in a second position.
Figure 3:
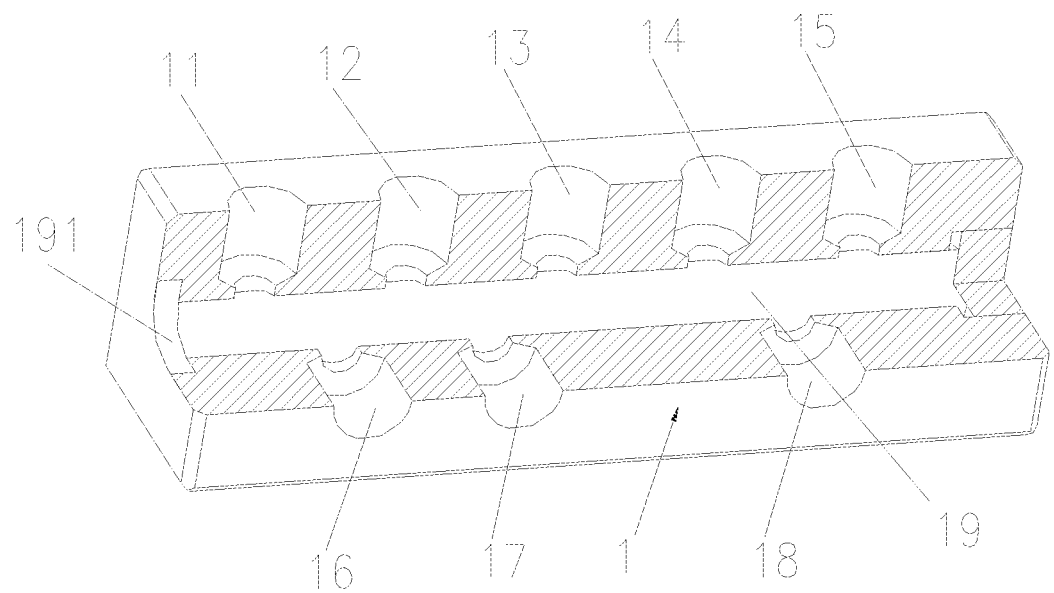
FIG. 3 is a schematic diagram of a valve body in FIG. 1.

As shown in FIG. 1, FIG. 2, and FIG. 3, a two-position eight-way valve, including a valve body 1, a sliding column 2, and a control mechanism 3. The valve body 1 is provided with an accommodating space 19 having an opening 191, the control mechanism 3 is connected to the opening 191, and provided on a sidewall of the accommodating space 19 are a first through hole 11, a second through hole 12, a third through hole 13, a fourth through hole 14, a fifth through hole 15, a sixth through hole 16, a seventh through hole 17 and an eighth through hole 18 allowing the accommodating space 19 to be in communication with the external environment. The sliding column 2 is provided within the accommodating space 19 and is connected to the control mechanism 3, and the control mechanism 3 can drive the sliding column 2 to shift and move between a first position away from the opening 191 and a second position in proximity to the opening 191, thus controlling the opening and closing of the first through hole 11, the second through hole 12, the third through hole 13, the fourth through hole 14, the fifth through hole 15, the sixth through hole 16, the seventh through hole 17 and the eighth through hole 18. With such a technical solution, integration of functions of multiple solenoid valves can be achieved, which is not only inexpensive and easy to control, but is also convenient to mount, and increases production efficiency. In practical manufacture, the control mechanism 3 can be sealedly connected to the opening 191, so as to seal the accommodating space 19, further ensuring overall tightness of the two-position eight-way valve.

Figure 4:
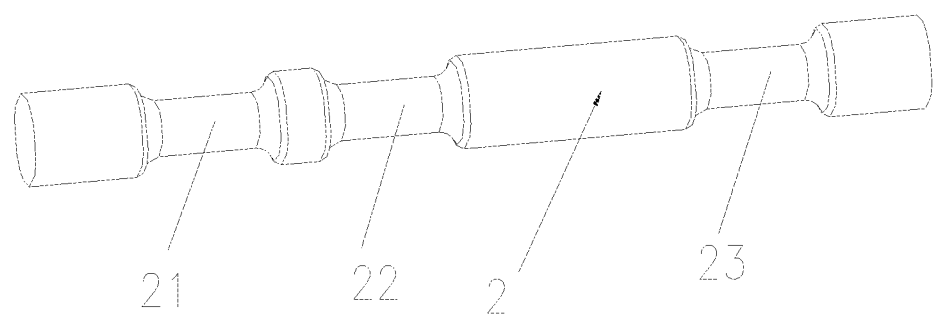
FIG. 4 is a schematic diagram of the sliding column in FIG. 1.

Specifically, as shown in FIG. 4, a first groove 21, a second groove 22 and a third groove 23 separated from each other are provided on a side face of the sliding column 2. When the sliding column 2 is located in the first position, the second through hole 12 and the sixth through hole 16 are both corresponding to the first groove 21, for allowing the second through hole 12 and the sixth through hole 16 to be in communication through the first groove 21, the third through hole 13 and the seventh through hole 17 are both corresponding to the second groove 22, for allowing the third through hole 13 and the seventh through hole 17 to be in communication through the second groove 22, and the fifth through hole 15 and the eighth through hole 18 are both corresponding to the third groove 23, for allowing the fifth through hole 15 and the eighth through hole 18 to be in communication through the third groove 23. When the sliding column 2 is located in the second position, the first through hole 11 and the sixth through hole 16 are both corresponding to the first groove 21, for allowing the first through hole 11 and the sixth through hole 16 to be in communication through the first groove 21, the second through hole 12 and the seventh through hole 17 are both corresponding to the second groove 22, for allowing the second through hole 12 and the seventh through hole 17 to be in communication through the second groove 22, and the fourth through hole 14 and the eighth through hole 18 are both corresponding to the third groove 23, for allowing the fifth through hole 15 and the eighth through hole 18 to be in communication through the third groove 23.

Preferably, the accommodating space 19 has a cylindrical shape, and the sliding column 2 is a cylinder having a diameter matched with that of the accommodating space 19. All of the first groove 21, the second groove 22 and the third groove 23 are in a ring shape extending in a circumferential direction of the sliding column 2, and arranged in turn along an axial direction of the sliding column 2, in this way the sliding column 2 can separate the through holes that need to be separated through a part between the first groove 21 and the second groove 22 and a part between the second groove 22 and the third groove 23, avoiding appearance of the phenomenon of blow-by, and further ensuring reliability of the function of the two-position eight-way valve.

In an implementable embodiment, as shown in FIG. 1 and FIG. 2, the control mechanism 3 includes a static iron core 31, an elastic component 32, and a movable iron core 33. The static iron core 31 is fixedly connected on the valve body 1, and is connected with the movable iron core 33 through the elastic component 32, and the movable iron core 33 is connected with the sliding column 2. The static iron core 31 is provided with a solenoid coil 311, and when the solenoid coil 311 is energized, the solenoid coil 311 can generate an electromagnetic force to attract the movable iron core 33 to overcome an elastic force of the elastic component 32 and move towards the direction of the static iron core 31, and further drive the sliding column 2 to move to the second position. When the solenoid coil 311 is de-energized, the elastic component 32 drives, relying on its own elastic force, the movable iron core 33 to move towards the direction away from the static iron core 31, further driving the sliding column 2 to move to the first position.

Further, as shown in FIG. 1 and FIG. 2, the control mechanism 3 further includes a connecting rod 34, and two ends of the connecting rod 34 are respectively detachably connected on the movable iron core 33 and the sliding column 2, so as to connect the movable iron core 33 and the sliding column 2 together. In this way, it not only can ensure reliability of the connection between the movable iron core 33 and the sliding column 2, but also facilitates disassembly and mounting between the two. It should be noted that the connection between the connecting rod 34 and the movable iron core 33 as well as the sliding column 2 may be in any manner that can achieve the object of the invention.

Embodiment 2

Provided is an electric vehicle air conditioning system, including the two-position eight-way valve 4 described in Embodiment 1. For the specific structure of the two-position eight-way valve 4 in the following description, reference can be made to FIG. 1 or FIG. 2.

Figure 5:
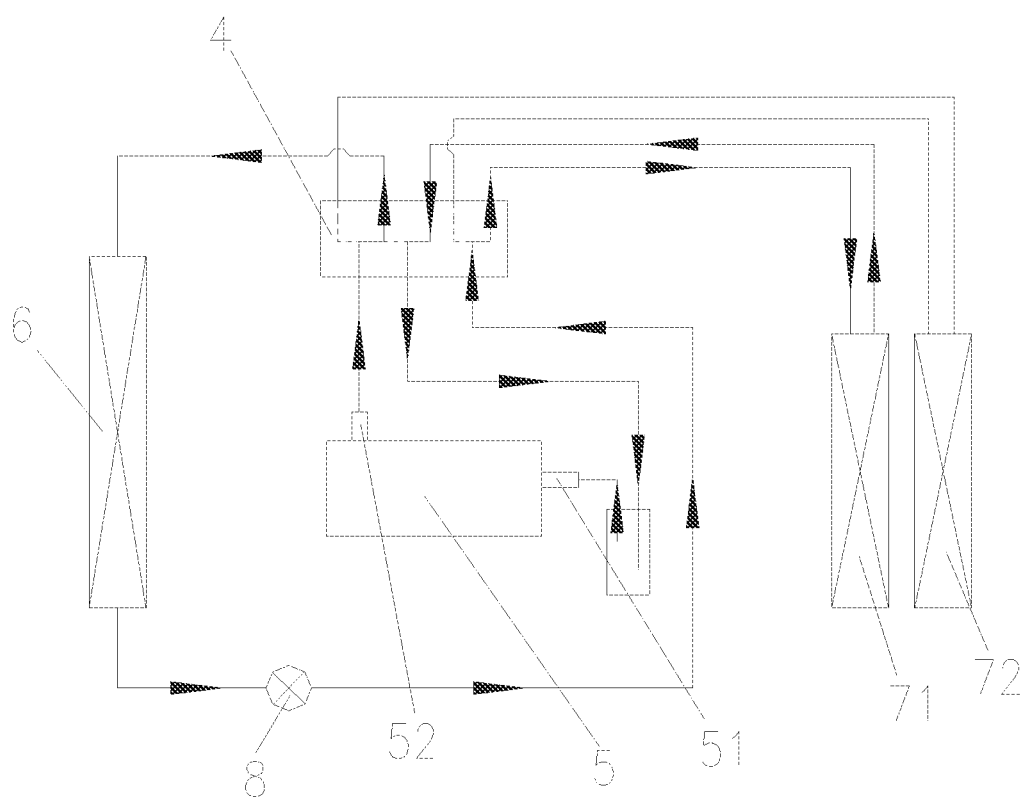
FIG. 5 is a schematic diagram of flowing directions of a refrigerant during cooling of an electric vehicle air conditioning system in Embodiment 2.
Figure 6:
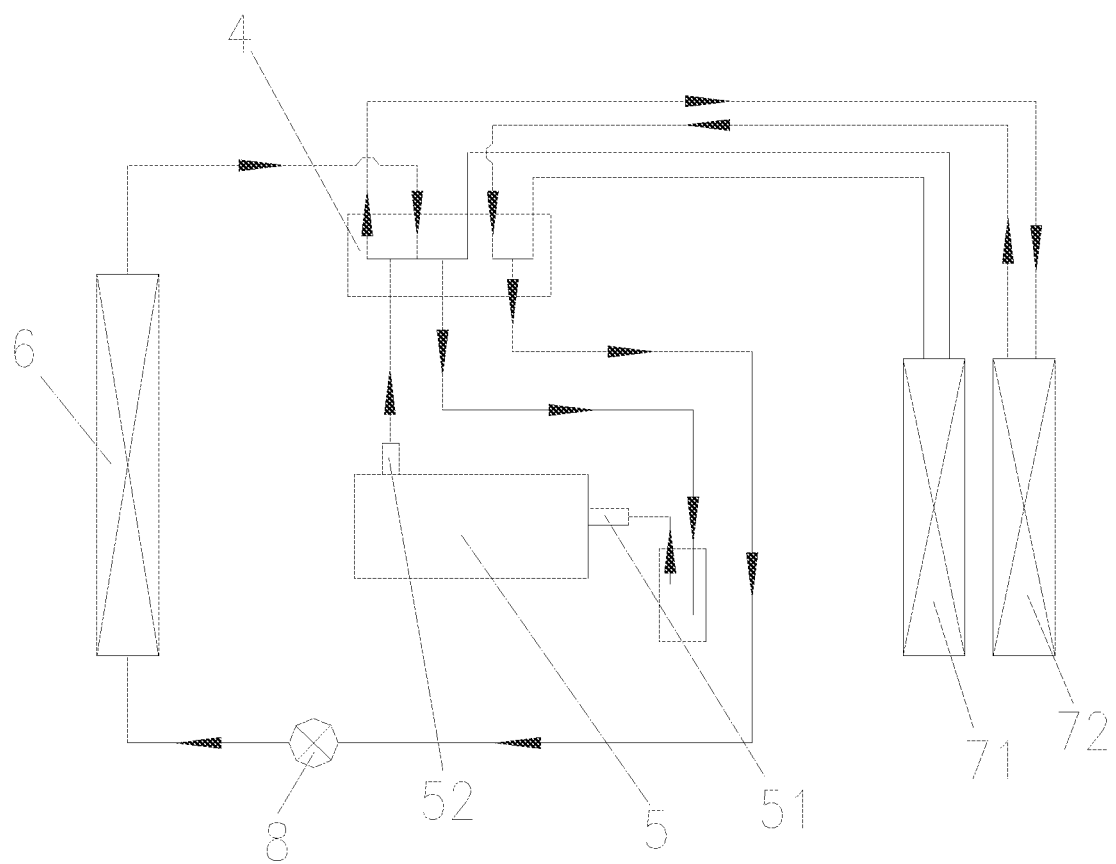
FIG. 6 is a schematic diagram of flowing directions of the refrigerant during heating of the electric vehicle air conditioning system in Embodiment 2.

Specifically, as shown in FIG. 5 and FIG. 6, directions of arrows in the figures are flowing directions of a refrigerant, and this electric vehicle air conditioning system further includes a compressor 5, an exterior heat exchanger 6 and a first interior heat exchanger 71. The compressor 5 has a refrigerant inlet 51 and a refrigerant outlet 52, the refrigerant inlet 51 is connected to the seventh through hole 17, the refrigerant outlet 52 is connected to the sixth through hole 16, two ends of the exterior heat exchanger 6 are respectively connected to the second through hole 12 and the eighth through hole 18, and two ends of the first interior heat exchanger 71 are respectively connected to the third through hole 13 and the fifth through hole 15, such that when the sliding column 2 is located in the first position, the first interior heat exchanger 71 is allowed to be respectively in communication with the compressor 5 and the exterior heat exchanger 6 through the two-position eight-way valve 4.

At this time, the two-position eight-way valve 4 is as shown in FIG. 1, and the sliding column 2 is located in the first position. At this time, the flowing directions of the refrigerant are as shown in FIG. 5, and after the system is stable, the refrigerant, after being pressurized by the compressor 5 and heated up, flows towards the sixth through hole 16 via the refrigerant outlet 52, at this time, the sixth through hole 16 is in communication with the second through hole 12, such that the refrigerant flows from the second through hole 12 towards the exterior heat exchanger 6. The refrigerant exchanges heat with the external environment through the exterior heat exchanger 6 and releases heat, and flows back to the eighth through hole 18. It should be noted that in specific manufacture, a throttling component 8 can be provided on a connecting pipeline between the exterior heat exchanger 6 and the eighth through hole 18, such that the refrigerant flowing from the exterior heat exchanger 6 to the eighth through hole 18 is throttled and expands. As the eighth through hole 18 is in communication with the fifth through hole 15 at this time, the refrigerant can flow from the fifth through hole 15 towards the first interior heat exchanger 71, and exchange heat with the in-vehicle environment through the first interior heat exchanger 71. After completing the heat exchange in the first interior heat exchanger 71, the refrigerant flows towards the third through hole 13, and since the third through hole 13 is in communication with the seventh through hole 17 at this time, the refrigerant can return back into the compressor 5 via the refrigerant inlet 51 through the seventh through hole 17, completing a cooling process.

In an implementable embodiment, the electric vehicle air conditioning system further includes a second interior heat exchanger 72. Two ends of the second interior heat exchanger 72 are respectively connected to the fourth through hole 14 and the first through hole 11, such that when the sliding column 2 is located in the second position, the second interior heat exchanger 72 is allowed to be in communication respectively with the compressor 5 and the exterior heat exchanger 6 through the two-position eight-way valve 4.

At this time, the two-position eight-way valve 4 is as shown in FIG. 1, and the sliding column 2 is located in the second position. At this time, the flowing directions of the refrigerant are as shown in FIG. 6, and after the system is stable, the refrigerant, after being pressurized by the compressor 5 and heated up, flows towards the sixth through hole 16 via the refrigerant outlet 52, at this time, the sixth through hole 16 is in communication with the first through hole 11, such that the refrigerant flows from the first through hole 11 towards the second interior heat exchanger 72. The refrigerant exchanges heat with the in-vehicle environment through the second interior heat exchanger 72 and releases heat, and flows back to the fourth through hole 14. At this time, the fourth through hole 14 is in communication with the eighth through hole 18, such that after flowing from the eighth through hole 18 and throttled by the throttling component 8 to expand, the refrigerant flows towards the exterior heat exchanger 6. After exchanging heat with the external environment in the exterior heat exchanger 6, the refrigerant flows back to the second through hole 12. Since the second through hole 12 is in communication with the seventh through hole 17 at this time, the refrigerant can return back into the compressor 5 via the refrigerant inlet 51 through the seventh through hole 17, completing a heating process.

The above embodiments allow the present invention to have advantages of being capable of realizing the integration of the functions of multiple solenoid valves, being not only inexpensive and easy to control, but also convenient to mount, and increasing the production efficiency.

The above-mentioned are merely for embodiments of the present invention rather than limiting the present invention. For a person skilled in the art, various modifications and changes may be made to the present invention. Any amendments, equivalent replacements, improvements and so on, within the spirit and principle of the present invention, should be covered within the scope of the claims of the present invention.

The invention claimed is:

1. A two-position eight-way valve, comprising:
   a valve body, a sliding column, and a control mechanism, wherein the valve body is provided with an accommodating space having an opening, and the control mechanism is connected to the opening;
   provided on sidewalls of the accommodating space are a total of eight through holes including a first through hole, a second through hole, a third through hole, a fourth through hole, a fifth through hole, a sixth through hole, a seventh through hole and an eighth through hole allowing the accommodating space to be in communication with external environment, wherein the first, second, third, fourth, and fifth through holes are sequentially arranged on a sidewall of the accommodating space, the sixth, seventh, and eighth through holes are sequentially arranged on an other sidewall of the accommodating space; and
   the sliding column is provided within the accommodating space and is connected to the control mechanism, and the control mechanism can drive the sliding column to shift and move between a first position away from the opening and a second position in proximity to the opening, thus controlling opening and closing of the first through hole, the second through hole, the third through hole, the fourth through hole, the fifth through hole, the sixth through hole, the seventh through hole and the eighth through hole.

2. The two-position eight-way valve according to claim 1, wherein the control mechanism is sealedly connected to the opening, so as to seal the accommodating space.

3. The two-position eight-way valve according to claim 1, wherein a first groove, a second groove and a third groove separated from each other are provided on a side face of the sliding column;
   when the sliding column is located in the first position, the second through hole and the sixth through hole are both corresponding to the first groove, for allowing the second through hole and the sixth through hole to be in communication through the first groove, the third through hole and the seventh through hole are both corresponding to the second groove, for allowing the third through hole and the seventh through hole to be in communication through the second groove, and the fifth through hole and the eighth through hole are both corresponding to the third groove, for allowing the fifth through hole and the eighth through hole to be in communication through the third groove.

4. The two-position eight-way valve according to claim 3, wherein when the sliding column is located in the second position, the first through hole and the sixth through hole are both corresponding to the first groove, for allowing the first through hole and the sixth through hole to be in communication through the first groove, the second through hole and the seventh through hole are both corresponding to the second groove, for allowing the second through hole and the seventh through hole to be in communication through the second groove, and the fourth through hole and the eighth through hole are both corresponding to the third groove, for allowing the fifth through hole and the eighth through hole to be in communication through the third groove.

5. The two-position eight-way valve according to claim 3, wherein the accommodating space has a cylindrical shape, and the sliding column is a cylinder having a diameter matched with that of the accommodating space; and
   all of the first groove, the second groove and the third groove are in a ring shape extending in a circumferential direction of the sliding column, and arranged in turn along an axial direction of the sliding column.

6. The two-position eight-way valve according to claim 1, wherein the control mechanism comprises a static iron core, an elastic component, and a movable iron core;
   the static iron core is fixedly connected on the valve body, and is connected with the movable iron core through the elastic component, and the movable iron core is connected with the sliding column; and
   the static iron core is provided with a solenoid coil, and when the solenoid coil is energized, the static iron core attracts the movable iron core through an electromagnetic force to drive the sliding column to move to the second position, and when the solenoid coil is de-energized, the elastic component drives, relying on its own elastic force, the movable iron core to drive the sliding column to move to the first position.

7. The two-position eight-way valve according to claim 6, wherein the control mechanism further comprises a connecting rod; and
   two ends of the connecting rod are respectively detachably connected on the movable iron core and the sliding column, so as to connect the movable iron core and the sliding column together.

8. An electric vehicle air conditioning system, comprising:
   a two-position eight-way valve, comprising:
      a valve body, a sliding column, and a control mechanism, wherein the valve body is provided with an accommodating space having an opening, and the control mechanism is connected to the opening;
      provided on sidewalls of the accommodating space are a total of eight through holes including a first through hole, a second through hole, a third through hole, a fourth through hole, a fifth through hole, a sixth through hole, a seventh through hole and an eighth through hole allowing the accommodating space to be in communication with external environment, wherein the first, second, third, fourth, and fifth through holes are sequentially arranged on a sidewall of the accommodating space, the sixth, seventh, and eighth through holes are sequentially arranged on an other sidewall of the accommodating space; and the sliding column is provided within the accommodating space and is connected to the control mechanism, and the control mechanism can drive the sliding column to shift and move between a first position away from the opening and a second position in proximity to the opening, thus controlling opening and closing of the first through hole, the second through hole, the third through hole, the fourth through hole, the fifth through hole, the sixth through hole, the seventh through hole and the eighth through hole.

9. The electric vehicle air conditioning system according to claim 8, further comprising a compressor, an exterior heat exchanger and a first interior heat exchanger, wherein the compressor has an refrigerant inlet and an refrigerant outlet, the refrigerant inlet is connected to the seventh through hole, the refrigerant outlet is connected to the sixth through hole, two ends of the exterior heat exchanger are respectively connected to the second through hole and the eighth through hole, and two ends of the first interior heat exchanger are respectively connected to the third through hole and the fifth through hole, such that when the sliding column is located in the first position, the first interior heat exchanger is allowed to be respectively in communication with the compressor and the exterior heat exchanger through the two-position eight-way valve.

10. The electric vehicle air conditioning system according to claim 9, further comprising a second interior heat exchanger, wherein two ends of the second interior heat exchanger are respectively connected to the fourth through hole and the first through hole, such that when the sliding column is located in the second position, the second interior heat exchanger is allowed to be in communication respectively with the compressor and the exterior heat exchanger through the two-position eight-way valve.

* * * * *